United States Patent [19]

Hayward et al.

[11] Patent Number: 5,071,539

[45] Date of Patent: Dec. 10, 1991

[54] FCC CATALYSTS OF INCREASED EFFECTIVE HEAT CAPACITY

[75] Inventors: Chi-Mi T. Hayward, Lawrenceville; Barry K. Speronello, River Edge; William R. Gustafson, Lincroft; Gerald S. Koermer, Springfield, all of N.J.

[73] Assignee: Engelhard Corporation, Iselin, N.J.

[21] Appl. No.: 576,109

[22] Filed: Aug. 30, 1990

Related U.S. Application Data

[63] Continuation of Ser. No. 287,684, Dec. 20, 1988, abandoned, which is a continuation of Ser. No. 165,436, Feb. 29, 1988, abandoned, which is a continuation of Ser. No. 884,577, Jul. 11, 1986, abandoned, which is a continuation-in-part of Ser. No. 771,334, Aug. 30, 1985, abandoned.

[51] Int. Cl.$^5$ ............................................. C10G 11/04
[52] U.S. Cl. .................................... 208/114; 208/113; 208/120; 208/149; 208/159
[58] Field of Search ............... 208/120, 114, 149, 113, 208/160, 159; 502/202, 64

[56] References Cited

U.S. PATENT DOCUMENTS

| | | | |
|---|---|---|---|
| 2,400,176 | 5/1946 | Thiele | 208/149 |
| 2,462,891 | 3/1949 | Noll | 208/149 |
| 2,889,266 | 6/1959 | Baker et al. | 288/114 |
| 3,072,563 | 1/1963 | Hickson | 208/120 |
| 3,328,119 | 6/1967 | Robson | 208/120 |
| 3,740,347 | 6/1973 | Rosen et al. | 502/64 |
| 3,803,026 | 4/1974 | Jaffe | 502/84 |
| 3,847,797 | 11/1974 | Pasternak et al. | 208/114 |
| 3,856,705 | 12/1974 | McArthur | 423/213.5 |
| 4,192,770 | 3/1980 | Singleton | 208/52 CT |
| 4,432,890 | 2/1984 | Beck et al. | 502/62 |
| 4,493,902 | 1/1985 | Brown et al. | 502/68 |

FOREIGN PATENT DOCUMENTS

| | | | |
|---|---|---|---|
| 0023802 | 2/1981 | European Pat. Off. | 208/58 |
| 1459953 | 12/1976 | United Kingdom | 502/84 |
| 2014468 | 8/1979 | United Kingdom | 208/111 |

*Primary Examiner*—Anthony McFarlane

[57] ABSTRACT

A catalytic composition for use in fluid catalytic cracking has an effective heat capacity of at least about 0.29 BTU/lb. °F. over the range from 950° F. to 1300° F. The composition may include microspheres containing in situ crystallized Y-faujasite and fluidizable particles consisting essentially of dimagnesium borate. The catalytic composition may include a heat retention component selected from the group consisting of dimagnesium borate, aluminum borate, magnesium tetraborate, magnesium orthoborate, lithim aluminum borate, lithium magnesium borate, lithium aluminum silicate, and lithium aluminate.

26 Claims, No Drawings

FCC CATALYSTS OF INCREASED EFFECTIVE HEAT CAPACITY

This is a continuation of copending application Ser. No. 07/287,684 filed on Dec. 20, 1988, now abandoned, which was a continuation of Ser. No. 07/165,436 filed Feb. 29, 1988 (now abandoned), which was a continuation of Ser. No. 06/884,577 filed July 11, 1986 (now abandoned), which is a CIP of Ser. No. 07/771,334 filed Aug. 30, 1985, now abandoned.

BACKGROUND OF THE INVENTION

Fluid catalytic cracking is central to modern petroleum refineries. Zeolite containing cracking catalysts efficiently convert less valuable long chain hydrocarbons to more valuable shorter molecules. In many cases, the production of an entire refinery complex is controlled by its Fluid Catalytic Cracking (FCC) unit. In many cases, it would be desirable to increase the profitability of the FCC unit by some means such as increasing the reactor temperature as this would normally lead to increased conversion and cracked products of higher octane, or by the processing of lower quality, less costly feedstocks. However, both increased conversion and the processing of lower quality feedstocks can lead to an unacceptably high temperature within the regenerator. Thus, the production of the FCC unit and in turn, the refinery, is often limited by the maximum temperature that the construction of the regenerator can tolerate. Therefore, it is desirable to obtain methods of increasing the FCC unit profitability without unduly increasing regenerator temperature.

SUMMARY OF THE INVENTION

The method and catalyst compositions of the present invention provide for catalytic cracking with improved yields at a constant regenerator temperature and may be used with any conventional zeolitic cracking catalyst but is exceptionally well suited for use with high zeolite catalysts such as those disclosed in U.S. Pat. No. 4,493,902. According to the present invention, regenerator temperature is controlled by incorporating a heat retention component into the catalyst composition. The high heat capacity component may either be incorporated into the matrix of the zeolite containing particles or it may be present as separate particles circulating with the zeolite containing particles. In many circumstances, it is advantageous to incorporate the heat capacity increasing component both into the matrix of the zeolite containing particles as well as to include separate particles with high heat capacity. There are three primary requirements for the high heat capacity component: it must not destroy zeolite too rapidly, it must not result in unacceptably high selectivity to coke and light gaseous products or low selectivity to gasoline, and its effective heat capacity must be in excess of 0.29 BTU/lb. °F. in the temperature range between the reactor temperature of about 950° F. and the regenerator temperature of about 1300° F. In many cases, it will be advantageous to use a material which upon heating undergoes an endothermic reversible phase change between the reactor temperature and the regenerator temperature. Further, many materials which tend to destroy zeolite too rapidly may be incorporated into non-zeolite containing particles in the catalytic composition by coating the material with a protective material which prevents or delays the interaction between the zeolite and the heat retention material. Similarly, zeolite deactivating materials may be incorporated into the matrix of zeolite containing particles if suitable passivating components are also included.

DESCRIPTION OF THE PREFERRED EMBODIMENT

The preferred heat retention components are fluidizable particles consisting essentially of inert compounds, such as the oxides of lithium, beryllium, boron and magnesium as well as carbon containing compounds of these. A preferred heat retention composition is dimagnesium borate ($2MgO.B_2O_3$) containing an excess of MgO over the 54 weight % stoichiometric value to ensure that $B_2O_3$ is immobilized to alleviate interaction with zeolite. This composition is quite inert with respect to zeolite. The incorporation of 2-10% of alumina ($Al_aO_3$) to this dimagnesium borate system stabilizes this material more effectively. At higher steaming temperatures (>1500° F.), less activity loss of zeolite is obtained using an alumina containing magnesium borate (e.g. 5% $Al_2O_3$-$2MgO.B_2O_3$) than a pure dimagnesium borate sample. Additional inert magnesium borate samples include $3MgO.B_2O_3$, 5% $Al_2O_3$-$3MgO.B_2O_3$ and $2MgO.B_2O_3.Al_2O_3$. These compositions contain 32 to 65 weight % MgO, and an $Al_2O_3$ content of up to 40 weight percent. Another suitable relatively inert compound is boron carbide ($B_4C$). Other suitable but less inert compositions include lithium magnesium borate ($Li_2O.MgO.B_2O_3$), including MgO in excess of 55 weight % stoichiometric value, lithium aluminates ($Li_2O.Al_2O_3$), including aluminum oxide in excess of the 80 weight % stoichiometric value, magnesium borate ($MgO.B_2O_3$) containing MgO in less than 54 weight % stoichiometric value and lithium aluminum silicates ($Li_2O.Al_2O_3.SiO_2$) containing lithium oxide in less than the 20 weight % stoichiometric value. Other suitable compounds which should normally be encapsulated or otherwise passivated include lithium aluminum borate ($2Li_2O.Al_2O_3.B_2O_3$), lithium magnesium borates including either boron oxide in excess of the 30 weight % stoichiometric value or lithium oxide in excess of the 15 weight % stoichiometric value, lithium aluminates ($Li_2O.Al_2O_3$) containing lithium oxide in excess of the 20 weight % stoichiometric value, lithium aluminum silicates including lithium oxide in excess of the 20 weight % stoichiometric value and boron phosphate ($B_2O_3.P_2O_5$). While these materials can be used to provide increased heat capacity, it will normally be prudent to encapsulate them with a more inert material such as magnesia or alumina to protect the zeolite from premature deactivation due to interaction with the heat retention component. The preferred zeolite for incorporation in the compositions of the present invention is zeolite-Y, i.e. faujasite in any of its several catalytically useful embodiments such as ultrastabilized, ammonium form, rare earth form and the like.

Heat balance calculations around the regenerator of FCC units show that increasing the heat capacity of the respective FCC catalyst will reduce the temperature of the catalyst or contact material in the regenerator. While old prior art such as U.S. Pat. No. 2,400,176, E. W. Thiele, (1946) and U.S. Pat. No. 2,462,891, H. D. Noll, (1949) refer to incorporation of heat retention materials into FCC catalysts, they fail to suggest the use of materials having heat capacities substantially in excess of 0.27 BTU/lb. °F. nor do they suggest the use of high heat capacity materials which have been encapsulated to protect zeolite used therewith from premature deactivation. Further, this invention is particularly suitable for use with high zeolite content catalysts such as those described in U.S. Pat. No. 4,493,902 incorporated herein by reference, but the prior art references fail to suggest that the benefits obtained by incorporating "heat retention materials" would be greater for high zeolite content catalysts. Therefore, this invention relates to novel FCC catalysts having effective heat capacities greater than conventional FCC catalysts (i.e. about 0.27 BTU/lb. °F.). This invention also relates to a specific method of manufacturing such a catalyst by combining high activity cracking component microspheres with separate microspheres containing a high heat capacity component such as $2MgO.B_2O_3$.

For the purpose of this invention, effective heat capacity (Cpe) of a catalyst is defined as follows:

$$\frac{\text{effective catalyst}}{\text{heat capacity } (Cpe)} = \frac{\Delta H}{\text{Regen. Temp.} - \text{React. Temp.}}$$

where $\Delta H$ is the enthalpy change of the catalyst between reactor and regenerator temperatures This invention, in its broadest sense, concerns novel FCC catalysts having heat capacities greater than conventional FCC catalysts, and the use of such catalysts in FCC units such that they lower the regenerator temperature. Prior art suggested the use of inert high heat capacity materials for heat retention in FCC processes, but the accompanying disclosure indicates that they could not have achieved the results of the present invention because the disclosed materials did not have heat capacities substantially above that of conventional FCC catalysts. For example, the Thiele patent suggested the use of iron or quartz. Iron has a heat capacity 30% lower than FCC catalysts, and quartz has a comparable heat capacity to conventional FCC catalysts.

The present invention also provides for the preparation and use of high heat capacity catalysts (effective heat capacity greater than 0.29 BTU/lb. °F.) to reduce the regenerator temperature of FCC units. Two ways to achieve this include:

1. Produce FCC catalysts containing substantial amount of elements having an atomic number of from 3 to 12, e.g. compounds containing carbon, lithium, beryllium, boron, magnesium, etc.

2. Produce FCC catalysts which undergo a reversible endothermic transformation upon heating from conventional FCC stripping temperature (about 1000° F.) to regenerator temperatures (above 1100° F.) such that there is a corresponding exothermic transformation upon cooling from the regenerator temperature to the cracking reactor temperature (from above 1100° to 1000° F.).

Prior art relevant to this invention is disclosed in patents issued to Standard Oil Company (U.S. Pat. No. 2,400,176) and Houdry Process Corporation (U.S. Pat. No. 2,462,891). In both cases, the use of an inert material with high heat capacity for heat retention was proposed. However, the inventors did not anticipate the concept of the present invention, since the heat capacity of the materials claimed in their invention was less than or comparable to conventional FCC catalysts. The fact that these materials do not have a higher heat capacity than silica/alumina indicates that they are not suitable to reduce the regenerator temperature of FCC units.

This invention provides a novel composition of matter for FCC catalysts, i.e. one having an effective heat capacity of at least about 0.29 BTU/lb. °F. The process of using this catalyst in FCC units to crack hydrocarbons is also included. For example, two ways to achieve effective heat capacity greater than 0.27 BTU/lb. °F. are:

1. Produce FCC catalysts containing large amounts of elements having an atomic number of from 3 to 12, e.g. compounds containing carbon, lithium, beryllium, boron, magnesium, and the like either incorporated into the matrix of the zeolite containing particles or incorporated as fluidizable particles physically mixed and circulated with the zeolite containing particles.

2. Produce FCC catalysts materials which undergo a reversible endothermic transformation upon heating from conventional FCC stripping temperature (about 1000° F.) to regenerator temperatures (above 1100° F.) such that there is a corresponding exothermic transformation upon cooling from the regenerator temperature to the cracking reactor temperature (from above 1100° to 1000° F.).

Use of the catalytic compositions of the present invention makes it possible to burn more coke in the regenerator, obtain increased conversion, use a greater throughput of residual fractions and use feeds containing larger amounts of basic nitrogen compounds. The above described catalytic materials can be prepared, for example, by spray drying a high heat capacity component with a zeolite-Y containing component such as pure zeolite-Y. Another method of preparing this material is by blending separate fluidizable particles of a high heat capacity component with a zeolite-Y containing component. Small amounts of ZSM-5 zeolite (e.g. 1–5%) may be included in the catalytic microspheres if desired.

Based on heat balance calculations, a catalyst with high heat capacity is useful for reduction of regenerator temperatures. The measured heat capacity of conventional equilibrium FCC catalysts is 0.27 BTU/lb. °F. For example, a catalyst with a heat capacity of 0.29 BTU/lb. °F. will provide approximately 20° F. reduction of regenerator temperature, while a catalyst with a heat capacity of 0.32 BTU/lb. °F. will produce a 50° F. reduction in regenerator temperature.

The heat retention components described herein are particularly suitable for use with in situ crystallized Y-Faujasite containing microspheres of the types described in U.S. Pat. No. 4,493,902 even in the presence of metals such as nickel and vanadium as the heat retention component does not unduly aggravate the problems usually associated with the presence of these metals.

Throughout this specification (unless otherwise stated) all heat capacities are as determined using a Setaram 111 Differential Scanning Calorimeter (DSC) calibrated to indicate a value of 0.28 BTU/lb. °F. for the heat capacity of synthetic sapphire at 500° C. Alternatively, a DuPont 910 Differential Scanning Calorimeter (DSC) can be used but the Setaram 111 seems to provide the most consistent and meaningful results in the range of 1000° to 1300° F.

EXAMPLE I

The following example describes the preparation and use of a preferred high heat capacity material: $2MgO.B_2O_3$.

The $2MgO.B_2O_3$ sample was prepared by slurrying a mixture containing a 1:1 mole ratio of $Mg(OH)_2$ and $H_3BO_3$ in water, milling, extruding, drying, and then calcining at 1800° F. for one hour. The resulting solid was ground and washed twice with 20 g of water per gram of solid at a temperature of 90° C. for 0.5 to 1 hour to remove any unreacted $B_2O_3$ present in the product. Wet chemical analysis indicated a magnesia content of 55 weight % and a boron oxide content of 45 weight %.

The measured heat capacity of this $2MgO.B_2O_3$ sample is 0.37 BTU/lb. °F. at 700° C. (1292° F.). Based on a measured heat capacity of 0.27 BTU/lb. °F. for an equilibrium FCC catalyst, the use of this inert additive at 50 weight % provided a catalyst with a heat capacity of 0.32 BTU/lb. °F. heat capacity. Heat capacity measurements were made using two calorimeters, the DuPont 910 Differential Scanning Calorimeter and the Setaram 111 Differential Scanning Calorimeter. The DuPont system is capable of heat capacity measurements up to 700° C., while the Setaram system can be used up to 810° C. At temperatures above 500° C., the Seteram DSC provides more meaningful heat capacity data than the DuPont system. Heat capacity data were obtained using a reference heat capacity of 0.27 BTU/lb. °F. at 500° C. for Engelhard equilibrium catalysts such as Ultrasiv ® 260, Magnasiv ® 380 and HEZ-55 TM, and 0.28 BTU/lb. °F. at 500° C. for synthetic sapphire. Unless otherwise stated, all heat capacity measurements are to be understood to be as measured on the Setaram 111 calibrated to indicate a heat capacity of 0.28 BTU/lb. °F. at 500° C. for synthetic sapphire throughout this specification. Heat balance calculations demonstrate that a catalyst with an 0.32 BTU/lb. °F. heat capacity, when used in the place of a conventional FCC catalyst, can reduce regenerator temperatures by about 50° F.

The material prepared above was steamed as a blend with microspheres containing a high zeolite-Y content catalyst (prepared as described in Example 1 of U.S. Pat. No. 4,493,902, except that only a single rare earth exchange [to a rare earth oxide content of 8%] was carried out after the initial ammonium exchange) in a 1:1 weight ratio. The temperatures used were 1350° and 1450° F., using 100% steam at 1 atmosphere for four hours. MAT testing results of the steamed samples are provided below:

| Steaming Temperature | 1350° F. | 1450° F. |
| --- | --- | --- |
| Conversion (%) | 87 | 82 |

The same conversions were obtained for samples which contained $2MgO.B_2O_3$ and the high zeolite content catalyst which were steamed individually and then combined for MAT testing. These data indicate that no additional deactivation of zeolite-Y by the $2MgO.B_2O_3$ occurred during steaming.

When the same 1:1 blend described above was steamed at 1500° F. for 4 hours using 100% steam, a 59% conversion was obtained. Since a 76% conversion was obtained using the control sample, these data indicated some additional deactivation had occurred at the higher steaming temperature. However, better activity retention can be obtained (conversion=66%), if the dimagnesium borate sample is calcined at 1850° F. for 4 hours prior to steaming and MAT testing with the zeolite-Y component. However, activity loss in this test can be substantially eliminated if the dimagnesium borate is calcined at 1800° F. for 8 hours then washed twice as above. When the above test procedure was repeated using catalytic compositions containing dimagnesium borate which had been cleansed of active boron compounds in this fashion, a conversion at 76% was obtained after steaming.

EXAMPLE II

The following example describes a high heat capacity material which deactivates zeolite-Y and thus should be encapsulated with an inert material for use in this invention.

A $MgO.2B_2O_3$ sample was prepared by combining a 1:4 mole ratio of $Mg(OH)_2$ and $H_3BO_3$ in water. This mixture was milled, extruded, dried and then calcined at 1400° F. for one hour. The resulting solid was ground and washed twice with water. The dried solid obtained has a heat capacity of 0.35 BTU/lb. °F. at 500° C. (932° F.) using the DuPont DSC. This material was blended with a high zeolite-Y component as described in Example I in a 1:1 weight ratio and then steamed at 1450° F. using 100% steam for four hours. MAT testing results showed 6–10% conversion for this sample, which indicated that extensive zeolite deactivation had occurred during steaming. These data indicate that this magnesia deficient system is less suitable for use as a high heat capacity catalyst.

EXAMPLE III

The following example describes the preparation and use of a preferred high heat capacity material: 5% $Al_2O_3$-$2MgO.B_2O_3$ which 5% $Al_2O_3$-$2MgO.B_2O_3$ sample was prepared by combining 467 g of magnesium hydroxide (8 moles of $Mg(OH)_2$), 495 g of boric acid (8 moles of $H_3BO_3$) and 233 g of aluminum nitrate ($Al(NO_3)_3.9H_2O$) in water. This mixture was milled, extruded, dried and then calcined at 2000° F. for 8 hours. The solid formed was ground and washed. Wet chemical analysis indicated a magnesium oxide content of 52 weight %, a boron oxide content of 43 weight %, and an alumina content of 5 weight %.

The measured heat capacity of this 5% $Al_2O_3$-$2MgO.B_2O_3$ is 0.31 BTU/lb. °F. at 500° C. (932° F.) and 0.37 BTU/lb. ° F. at 700° C.(1292° F.), essentially identical to the $2MgO.B_2O_3$ (example I) heat capacity at these temperatures. This alumina containing material was blended with a high zeolite-Y content catalyst as described in Example I in a 1:1 weight ratio. The blended samples were steamed at 1450°, 1500° and 1550° F. for 4 hours using 100% steam. No activity loss was found for samples steamed at 1450° and 1500° F., as compared to control references. After steaming at 1550° F., the alumina containing magnesium borate sample had a 42% conversion. Since a 45% conversion was obtained for the control sample, these data indicated slight zeolite activity loss (12%) had occurred during steam treatment. However, a magnesium borate sample prepared using the same conditions but containing no alumina exhibited only 38 to 40% conversion (ca. 23% activity loss). In comparison, the 5% alumina sample gave substantially better activity retention, since it led to only about fifty percent as much zeolite activity loss. Furthermore, a magnesium borate sample containing about 3% alumina gave a 41% conversion under the same steaming conditions. These results demonstrate that incorporating alumina into magnesium borate provides a more stable heat retention component.

EXAMPLES IV-VI

Three additional high heat capacity systems were prepared having compositions as set forth in Table I using the procedures outlined in Example III then subsequently tested as set forth above after steaming at 1550° F., the results being as set forth in Table I which also sets forth the starting materials used for each preparation, the quantity of reactants used, measured heat capacities and the MAT conversions obtained after steam deactivation with the high zeolite content catalyst are provided in the above table. These additives also provided improved zeolite activity retention comparable to that of the 5% $Al_2O_3$-$2MgO.B_2O_3$ additive described in Example III but provided somewhat lower heat capacity.

TABLE I

| Example | Comp. | Reactants | | | Measured | |
| --- | --- | --- | --- | --- | --- | --- |
| | | $Mg(OH)_2(g)$ | $H_3BO_3(g)$ | $AlX_3$ | Cp | MAT+ |
| IV | $3MgO.B_2O_3$ | 525 | 371 | — | 0.30 | 40 |
| V | 5% $Al_2O_3$—$3MgO.B_2O_3$ | 525 | 371 | 221** | 0.30 | 42.5 |
| VI | $2MgO.B_2O_3.Al_2O_3$ | 292 | 309 | 390## | 0.29 | 40 |

**X = nitrate ($NO_3^-$)
X = hydroxide ($OH^-$)
Cp in BTU/lb. °F. at 500° C. (932° F.)
+Conversion (%)

EXAMPLE VII-X

The following data illustrate the metals tolerance profile of various high heat capacity catalyst samples at 1000 ppm Ni and 2000 ppm V level. These results show that, in the presence of nickel and vanadium contaminants, good activity retention was obtained after steaming of the combination as described in Example I and the heat retention compounds of the present invention of high zeolite content catalyst.

The testing procedures used were as developed by Mitchell (see Ind. Eng. Chem., Prod. Res. Dev., volume 19, page 209 (1980)). All catalyst components were impregnated with 1000 ppm Ni and 2000 ppm V as described therein. MAT conversion results were obtained after the blended sample was steam deactivated at 1450° F. for 4 hours using 90% steam and 10% air. Results obtained are set forth in Table II.

TABLE II

| Example | Wt % Additive | Conversion (%) |
| --- | --- | --- |
| VII | 60% $2.5MgO.B_2O_3$ | 78 |
| VIII | 60% 5% $Al_2O_3$—$2MgO.B_2O_3$ | 69 |
| IX | 60% $2MgO.B_2O_3$ | 65 |
| X | 40% 5% $Al_2O_3$—$2MgO.B_2O_3$ + 20% VCA | 74 |

Note: Additives (including heat retention components) were impregnated with 1000 ppm Ni and 2000 ppm V. All blends contained 40 weight percent of the high zeolite content catalyst impregnated with 1000 ppm Ni and 200 ppm V. $2.5MgO.B_2O_3$ was composed of 60 weight percent MgO and 40 weight percent $B_2O_3$. VCA=vanadium control additive comprising Magnesia (20% by weight) incorporated into calcined kaolin microspheres.

Since the control reference (obtained by steaming the metals impregnated high zeolite content catalyst then blended with steamed magnesium borate in a 40 to 60 weight ratio) gave a 75% conversion, the above results demonstrate that at the 1000 ppm Ni and 2000 ppm V level, zeolite activity can be maintained even while using the various high heat capacity components of the present invention in combination with high zeolite content catalysts in the presence of these metals at these concentrations.

We claim:

1. In a method of fluidized catalytic cracking of a petroleum feedstock including at least the steps of contacting the feedstock with a catalytic composition in a cracking zone at a cracking temperature to produce a cracked product, separating the catalytic composition from the cracked product, and regenerating said catalytic composition in the presence of oxygen at a regeneration temperature higher than said cracking temperature, the improvement wherein said catalytic composition comprises in intimate admixture a zeolite catalyst component with an effective heat capacity of less than about 0.29 BTU/lb. °F. over a temperature range of from said cracking temperature to said regeneration temperature and a heat absorbing component having an effective heat capacity of more than about 0.29 BTU/lb. °F. over the temperature from said cracking temperature to said regeneration temperature, said heat absorbing component consisting essentially of alumina-stabilized dimagnesium borate which is substantially inert with respect to said zeolite component throughout the cracking process and being present in an amount such that the heat capacity of the catalytic composition is at least about 0.29 BTU/lb. °F. over the temperature range from said cracking temperature to said regeneration temperature.

2. The method according to claim 1, wherein said heat absorbing component contains from about 2 percent to about 10 percent alumina.

3. The method according to claim 1, wherein said zeolite component and said heat absorbing component each consist of distinct first and second ensembles of fluidizable particles.

4. The method according to claim 1, wherein said heat absorbing component consists of from about 2 percent to about 10 percent alumina, and dimagnesium borate wherein the dimagnesium borate contains an excess of MgO over the stochiometric amount required to immobilize $B_2O_3$.

5. The method according to claim 1, wherein the zeolite containing component consists of microspheres containing in-situ crystallized Y-faujasite and said heat absorbing component consists essentially of fluidizable particles formed of alumina-stabilized dimagnesium borate as a separate set of microspheres.

6. The method according to claim 5, wherein the catalytic composition includes from about 15 percent to about 80 percent by weight of the Y-faujasite containing microspheres.

7. The method according to claim 1, wherein said catalytic composition consists of microspheres containing both Y-faujasite and alumina-stabilized dimagnesium borate.

8. The method according to claim 1, wherein said catalytic composition comprises microspheres containing Y-faujasite and microspheres including a core of alumina-stabilized dimagnesium borate encapsulated with an inert material chosen from the group consisting of magnesia and alumina.

9. The method according to claim 8, wherein the microspheres containing Y-faujasite include a silica-alumina matrix.

10. The method according to claim 1, wherein the heat capacity of said catalytic composition is at least about 0.29 BTU/lb. °F. over the temperature range from about 950° F. to about 1600° F.

11. The method according to claim 1, wherein said catalytic composition comprises microspheres including crystallized Y-faujasite, alumina stabilized dimagnesium borate containing from about 3 percent to about 10 percent alumina and a minor proportion of ZSM-5 zeolite.

12. The method according to claim 11, wherein said microspheres include a silica-alumina matrix.

13. In a method of fluidized cracking of a feedstock including at least the steps of contacting the feedstock with a catalytic composition in a cracking zone at a cracking temperature to produce a cracked product, separating the catalytic composition from the cracked product, and regenerating said catalytic composition in the presence of oxygen at a regeneration temperature higher than said cracking temperature, the improvement wherein said catalytic composition comprises as a first component a zeolite catalyst component with an effective heat capacity of less than about 0.29 BUT/lb. °F. over a temperature range of from said cracking temperature to said regeneration temperature and as a second component a heat absorbing component having an effective heat capacity of more than about 0.29 BTU/lb. °F. over a temperature range of from said cracking temperature to said regeneration temperature, wherein said heat absorbing component includes alumina stabilized dimagnesium borate containing from about 2 to about 10 percent alumina, and wherein said heat absorbing component is calcined to at least about 1800° F. prior to said fluidized cracking process, said heat absorbing component being substantially inert with respect to said zeolite catalyst, said first and second components being proportional so that said catalytic composition has an effective heat capacity of at least 0.29 BTU/lb. °F. over a temperature range of from said cracking temperature to said regeneration temperature.

14. The method according to claim 13, wherein said catalytic composition includes microspheres containing in-situ crystallized Y-faujasite and fluidizable particles consisting essentially alumina stabilized of dimagnesium borate.

15. The method according to claim 14, wherein the weight of particles containing Y-faujasite is from about 15 percent to about 80 percent of the weight of the catalytic composition.

16. The method according to claim 13, wherein said catalytic composition includes microspheres including both Y-faujasite and alumina stabilized dimagnesium borate.

17. The method according to claim 13, wherein said catalytic composition comprises microspheres including crystallized Y-faujasite, alumina stabilized dimagnesium borate and a minor proportion of ZSM-5 zeolite.

18. The method according to claim 17, wherein the catalytic composition comprises microspheres containing at least about 20 percent by weight Y-faujasite, at least about 10 percent by weight alumina stabilized dimagnesium borate and at least 1 percent by weight ZSM-5 zeolite, the balance consisting essentially of a silica-alumina matrix.

19. The method according to claim 18, wherein said catalytic composition has an effective heat capacity of at least about 0.29 BTU/lb. °F. over the range from 950° F. to 1600° F.

20. The method according to claim 13, wherein said catalytic composition includes microspheres containing crystallized Y-faujasite, alumina stabilized dimagnesium borate containing from about 3 percent to about 10 percent alumina and a minor proportion of ZSM-5 zeolite.

21. The method according to claim 13, wherein said catalytic composition retains substantial cracking activity after steam treatment at temperatures of about 1350° F. and above.

22. The method according to claim 21, wherein said catalytic composition retains substantial zeolite cracking activity after steam treatment at temperatures of about 1450° F. and above.

23. The method according to claim 22, wherein said catalytic composition retains substantial cracking activity after steam treatment at a temperature of about 1500° F.

24. A method of fluidized catalytic cracking of a petroleum feedstock including at least the steps of contacting the feedstock with a catalytic composition in a reaction zone at a cracking temperature to produce a cracked product, separating the catalytic composition from the cracked product and regenerating said catalytic composition in the presence of oxygen in a regeneration zone at a regeneration temperature wherein the catalytic composition retains catalytic cracking activity after steaming at elevated temperature above about 1350° F. and comprises at least a composition of matter having a first and second component in distinct phases, at least one of said components having cracking activity and containing at least a substantial portion of silica, the other component includes alumina stabilized dimagnesium borate containing from 2 to 10% alumina and wherein said other component is calcined to at least about 1800° F. prior to said fluidized cracking process and said other component having a heat capacity above about 0.29 BTU/lb. °F. and being substantially inert with respect to said component which is catalytically active, said first and second component being proportioned so that said catalytic composition has an effective heat capacity of at least 0.29 BTU/lb. °F. over a temperature range of from said cracking temperature to said regeneration temperature.

25. The method according to claim 24 wherein said catalytic composition has a heat capacity of 0.29 BTU/lb. °F. or more over the temperature range from about 950° to about 1600° F.

26. In a method of cracking a petroleum feedstock comprising generally the steps of cracking the petroleum feedstock in a cracking zone, in the presence of a catalytic composition, subsequently separating the cracked product from the catalytic composition, and regenerating the catalytic composition in a recirculating system, the improvement comprising co-circulating as the catalytic composition at least a first component of fluidizable particles and at least a second component of fluidized particles, said first component of fluidizable particles having cracking activity and having a heat capacity of less than 0.29 BTU/lb. °F., and said second component includes alumina stabilized dimagnesium borate containing from about 2 to about 10% alumina, and wherein said second component is calcined to at least about 1800° F. prior to said cracking process and said second component being substantially inert with respect to said first component and said first and second components being proportioned so that the mixture has an effective heat capacity of more than 0.29 BTU/lb. °F.

* * * * *